(12) United States Patent
Lam et al.

(10) Patent No.: US 8,633,991 B2
(45) Date of Patent: Jan. 21, 2014

(54) IMAGE STABILIZATION OF COMPACT IMAGING DEVICE

(75) Inventors: Sio Kuan Lam, Sheung Shui (HK); Chuen Kuen Yeung, Ma On Shan (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 583 days.

(21) Appl. No.: 12/638,461

(22) Filed: Dec. 15, 2009

(65) Prior Publication Data

US 2011/0141294 A1 Jun. 16, 2011

(51) Int. Cl.
*H04N 5/228* (2006.01)

(52) U.S. Cl.
USPC ......... 348/208.1; 348/143; 348/373; 348/374

(58) Field of Classification Search
USPC .............................................. 348/208.1, 143
See application file for complete search history.

(56) References Cited

U.S. PATENT DOCUMENTS

| | | | | |
|---|---|---|---|---|
| 6,741,391 | B1* | 5/2004 | Ishihara et al. | 359/372 |
| 6,793,415 | B2* | 9/2004 | Arbuckle | 396/427 |
| 7,251,087 | B2* | 7/2007 | Yamashita et al. | 359/822 |
| 8,305,482 | B2* | 11/2012 | Yen | 348/345 |
| 2002/0077069 | A1* | 6/2002 | Heurtaux | 455/90 |
| 2005/0195322 | A1* | 9/2005 | Park et al. | 348/373 |
| 2006/0092285 | A1* | 5/2006 | Shin | 348/208.7 |
| 2008/0292296 | A1* | 11/2008 | Ryu et al. | 396/55 |
| 2010/0091120 | A1* | 4/2010 | Nagata et al. | 348/208.4 |

FOREIGN PATENT DOCUMENTS

| | | |
|---|---|---|
| JP | 11-345378 | 12/1999 |
| JP | 2005-173372 | 6/2005 |
| JP | 2005-184122 | 7/2005 |

\* cited by examiner

*Primary Examiner* — Roberto Velez
*Assistant Examiner* — Cynthia Segura
(74) *Attorney, Agent, or Firm* — Berkeley Law & Technology Group, LLP

(57) ABSTRACT

The subject matter disclosed herein relates to an imaging device having a small form factor.

34 Claims, 9 Drawing Sheets

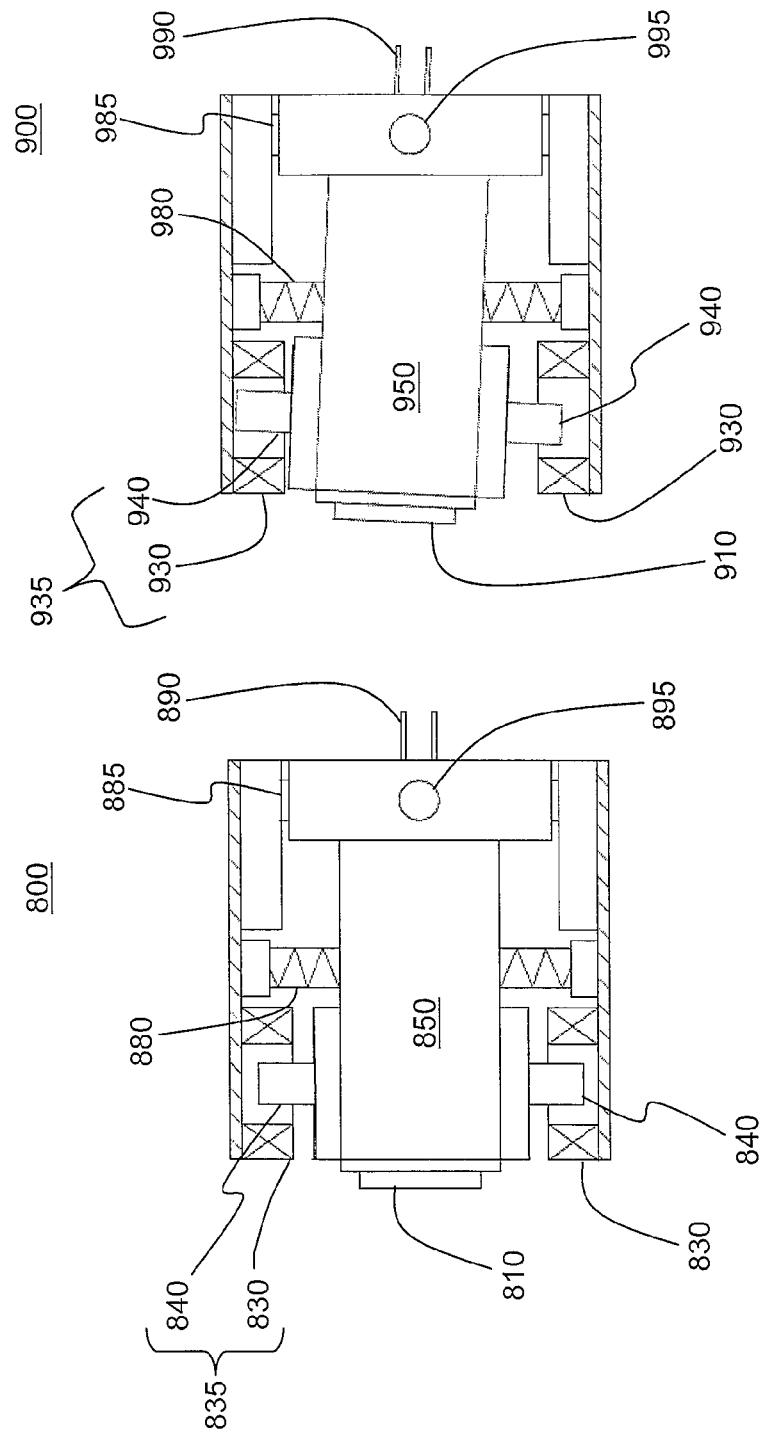

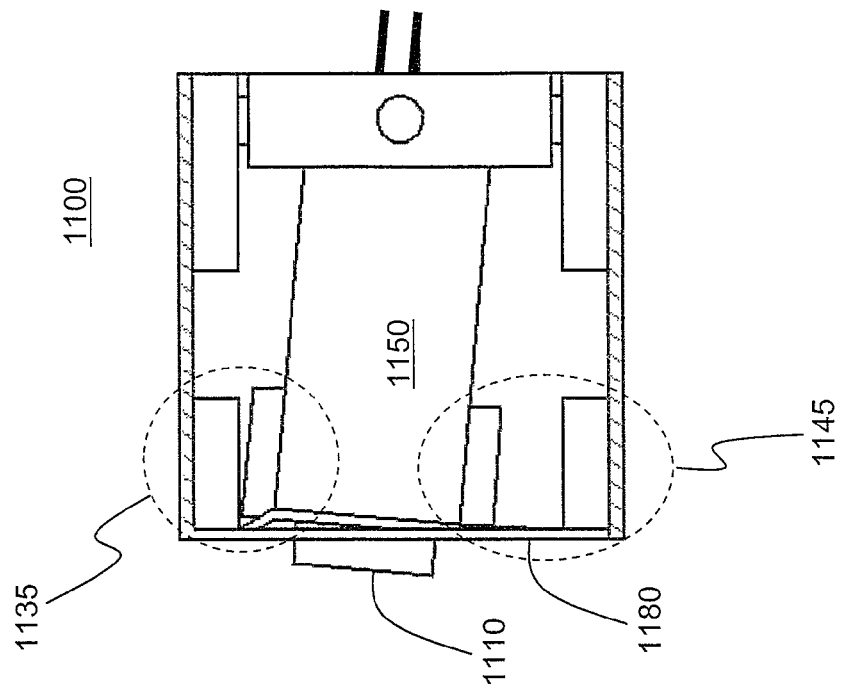
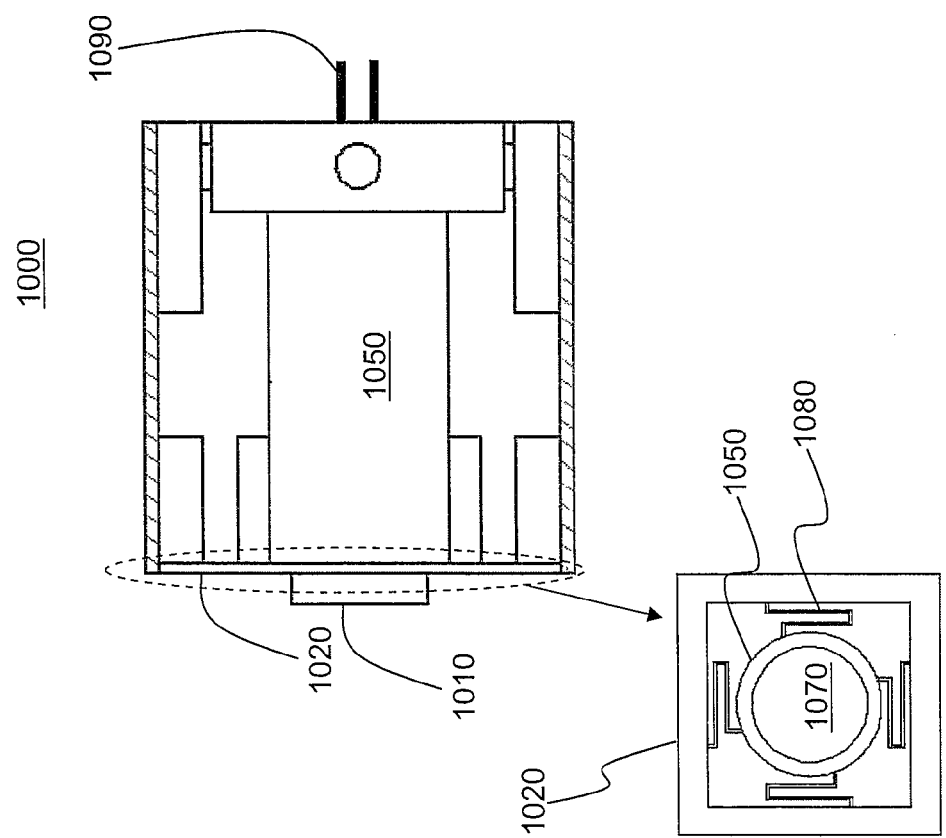
FIG. 11
FIG. 10

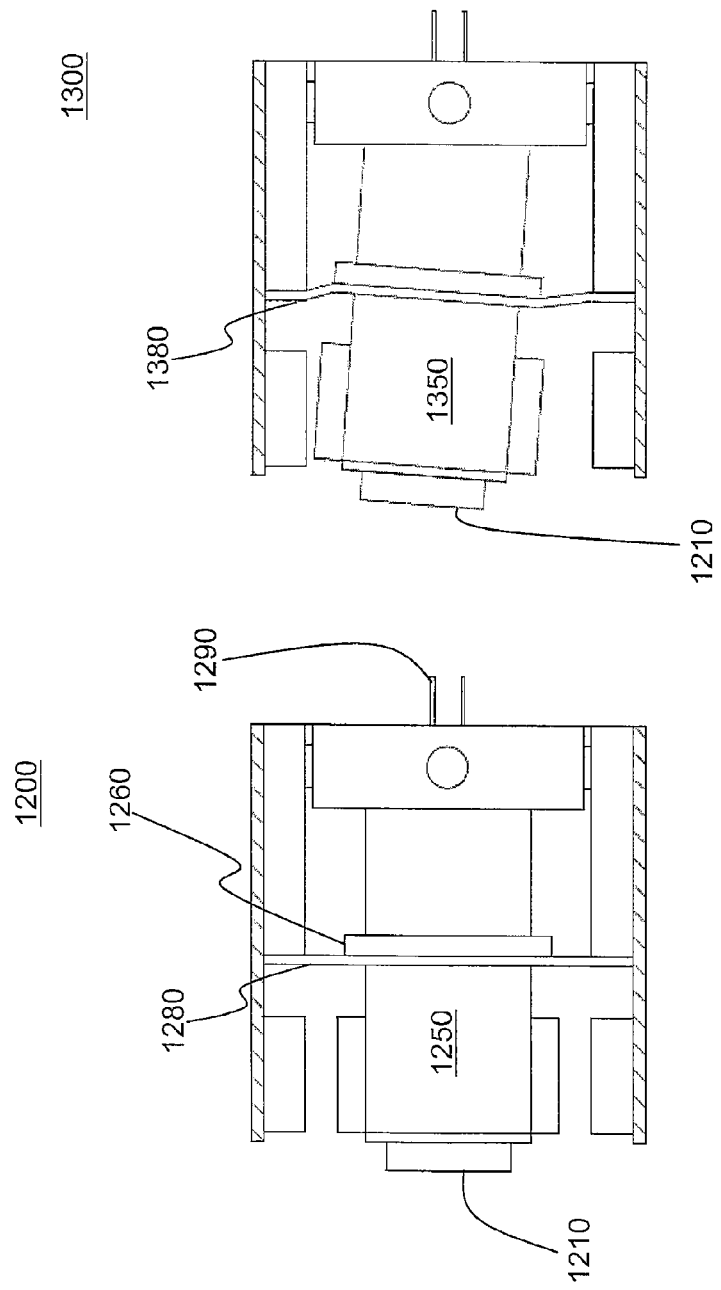

IMAGE STABILIZATION OF COMPACT IMAGING DEVICE

FIELD

The subject matter disclosed herein relates to an imaging device having image stabilization.

BACKGROUND

Many portable electronic apparatuses, such as a cellular phone and/or a personal digital assistant (PDA) for example, may include a compact camera module. Such a module may comprise an image sensor that incorporates anti-shake, image stabilization techniques in order to produce relatively high-quality images. As designers push toward slimmer, smaller, and/or lighter portable electronic apparatuses, compact camera module manufacturers, among others, are facing a challenge of providing smaller, high-performance, compact camera modules that can efficiently fit into small form factors.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIGS. 5-15 are side views of image sensor holder platforms, according to various embodiments.

DETAILED DESCRIPTION

Figure 1:
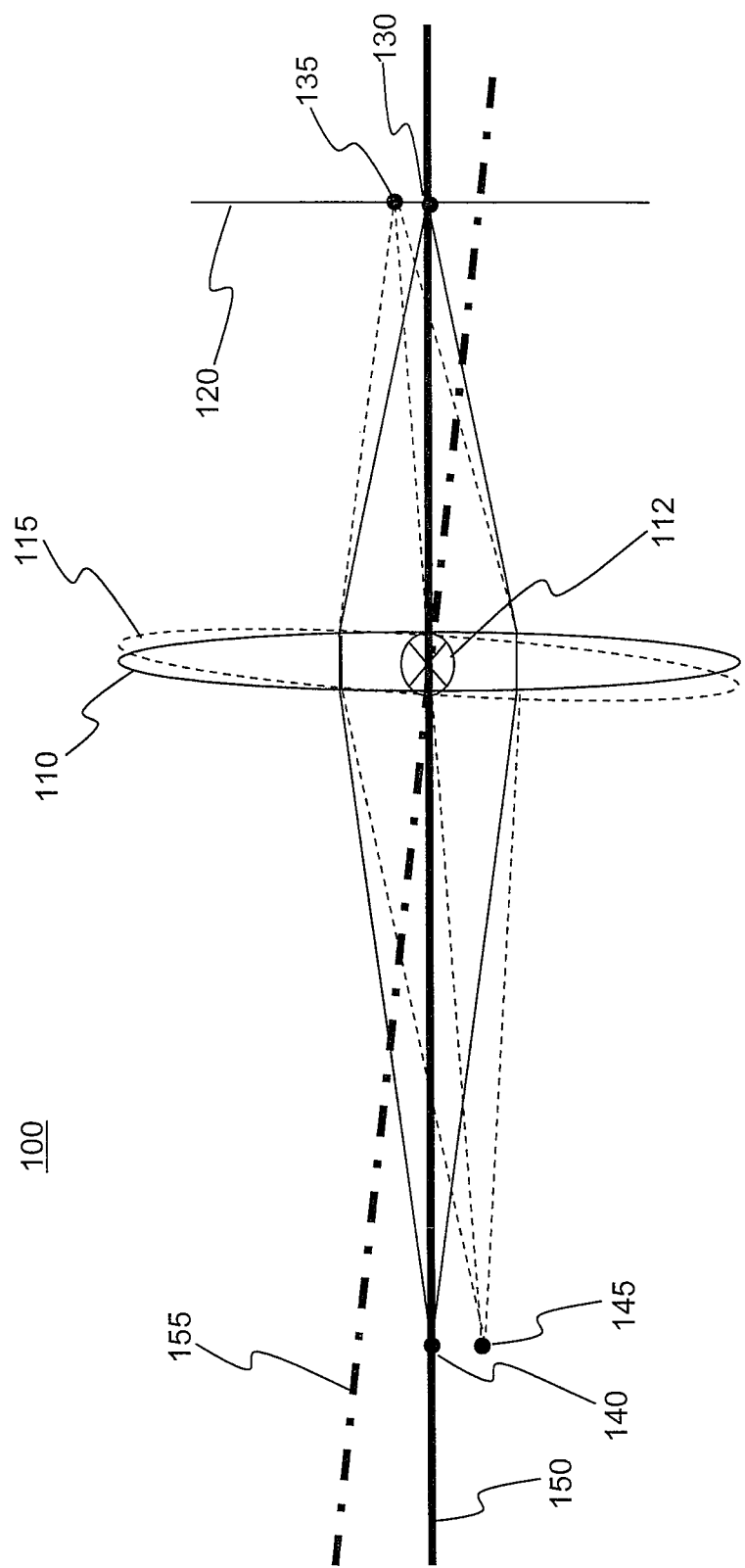
FIG. 1 is a schematic view of an imaging system, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

Embodiments described herein include an image sensor holder platform that may provide image stabilization using anti-shake techniques and/or mechanisms. Such image stabilization may compensate for image motion due to hand-shaking and/or other undesired motion of an optical imaging system, for example. An image sensor holder platform providing image stabilization may be employed in a camera used in a portable electronic apparatuses, such as a cellular phone and/or a personal digital assistant (PDA), for example. In a particular implementation, image stabilization may be accomplished by tilting and/or rotating an image plane of an image sensor to compensate for vibrations such as from shaking hands and so on. In one implementation, an image sensor may comprise a pixilated charge-coupled device (CCD) or a complementary metal-oxide-semiconductor (CMOS) device, for example. However, these are merely examples of particular imaging technologies that may be used, and claimed subject matter is not limited to any particular type of imaging technology. Such a motion-compensated image sensor may be mounted to an image sensor holder that provides an internal region wherein electrical conductors electrically connected to the image sensor may reside. Such an internal region may be hollow and extend from one end of an image sensor holder that includes an image sensor to an opposite end of the image sensor holder where such electrical conductors may exit. Such a configuration may allow an image sensor holder to achieve a relatively compact size and to avoid problems associated with dragging forces of such electrical conductors that may occur during motion compensation. In particular, such internally contained electrical conductors may exit an end region of an image sensor holder where the electrical conductors may experience relatively small bending angles during motion compensation of the image sensor holder.

In an embodiment, such an image sensor holder may compensate for motion about two substantially orthogonal axes by selectively energizing one or more actuators, which may comprise electromagnetic coils, as described in detail below. Additionally, one or more springs may provide a restoring force and/or a restoring torque for such actuators. Such springs may comprise coil springs and/or leaf springs, just to name a few examples. In a particular implementation, an image sensor holder may be configured to rotate about a center point of rotation comprising a virtual pivoting center, wherein a physical joint and/or point for guiding rotational motion need not be present. For example, a structure such as a ball joint structure need not be included in an image sensor holder platform in order to fix a position of a pivot center. Instead, such a pivot center (or pivot axis) may be defined by a spring system, as described below. In another example, a pivot center may be defined by a two-shaft system, though such a pivot center may be located at empty space of a hollow portion of an image sensor holder. Accordingly, a physical structure such as a shaft and/or pin need not pass through such a pivot center. Also, in a particular implementation, internally contained electrical conductors may exit an end region of an image sensor holder and pass through such a pivot center where the electrical conductors may not experience a drafting force during motion compensation of the image sensor holder. In this case, a pivot center may be located inside a hollow region of an image sensor holder. Of course, such details of an image sensor holder are merely examples, and claimed subject matter is not so limited.

FIG. 1 is a schematic view of an imaging system 100, according to an embodiment. Imaging system 100 may present an example of how lens rotation may affect image location. Such lens rotation may be involved in shaking or other undesired motion of an optical system (e.g., a camera). Such lens rotation may also be involved in image stabilization techniques that compensate for such shaking or other undesired motion. In a first case, a lens 110 may produce an image 130 on a screen 120 of an object 140 located along an optical axis 150. Also, lens 110 may produce an image 135 on screen 120 of an object 145 displaced from optical axis 150. Such a displaced object 145, which may originally comprise object 140, may result from an undesired movement and/or shaking of imaging system 100. In an implementation, lens 110 may be rotated to compensate for such movement or shaking. Thus, in a second case, lens 110 may be rotated about an axis 112 directed into the page to comprise rotated lens 115. Because of such a rotation, rotated lens 115 may have a rotated optical axis 155, leading to position shifts, and thus motion compensation and/or image stabilization, of images relative to lens 110. Of course, imaging system 100 is merely an example of image compensation, and claimed subject matter is not limited in this respect.

Figure 2:
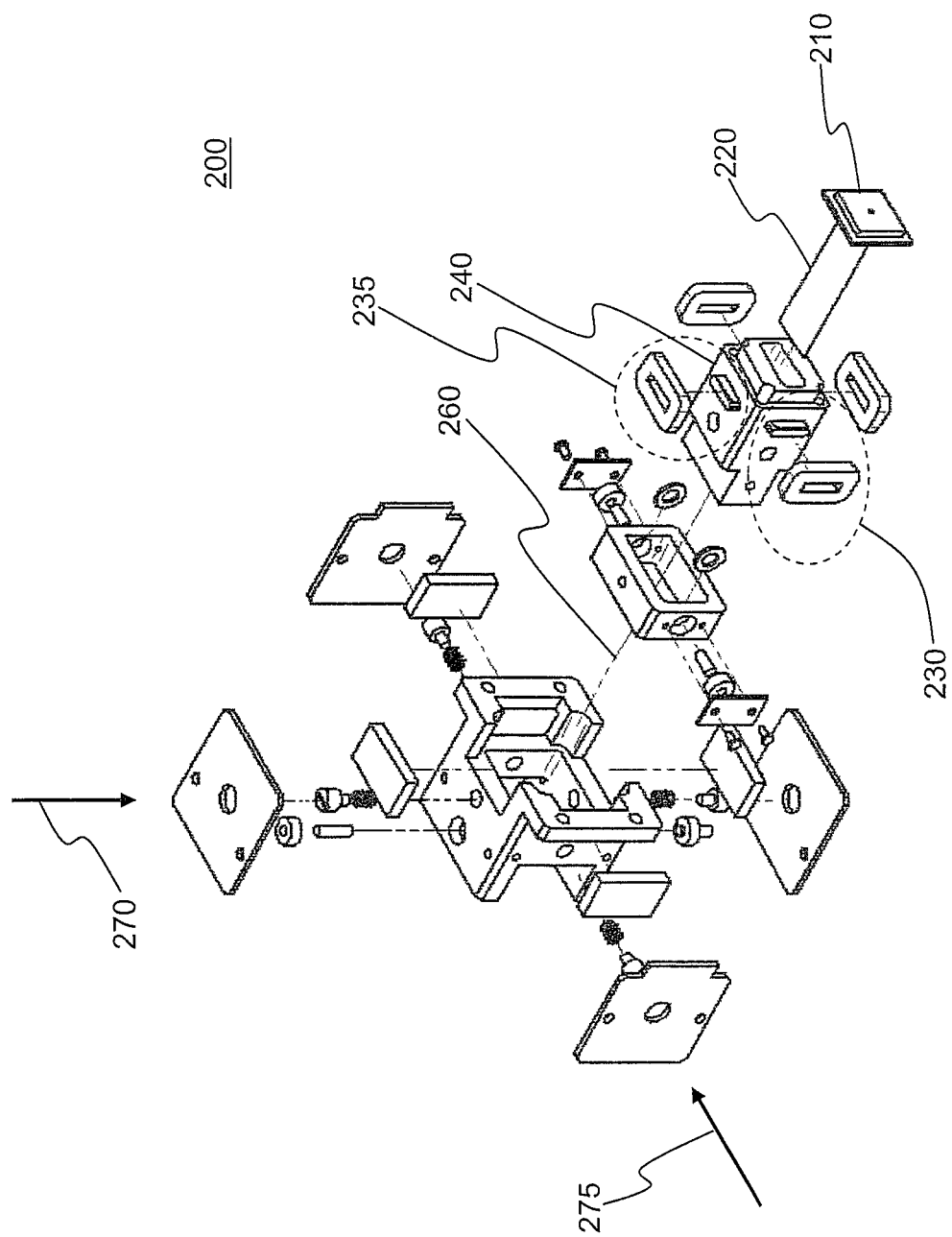
FIG. 2 is an exploded view of a compact imaging module, according to an embodiment.

FIG. 2 is an exploded view of a compact imaging module 200, according to an embodiment. Compact imaging module 200, which may be incorporated in a camera, for example, may include an image sensor 210 having one or more electrical connectors 220. In a particular implementation, such electrical connectors may comprise a flexible printed circuit board (PCB), ribbon cable, and/or individual wires, just to name a few examples. Image sensor 210 may be mounted onto an end face of image sensor holder 240. An axial region of image sensor holder 240 may be at least partially hollow to receive electrical connectors 220 while image sensor 210 is mounted to image sensor holder 240. Compact imaging module 200 may be rotatable about a first orthogonal axis 270 and a second orthogonal axis 275. First and second orthogonal axes 270 and 275 may be orthogonal to one another as well as being orthogonal to an optical axis 260 of compact imaging module 200. An actuator 230 may be implemented in order to rotate compact imaging module 200 about axis 270. Similarly, an actuator 235 may be implemented in order to rotate compact imaging module 200 about axis 275. As mentioned above, such actuators may comprise a coil and magnet to produce an electromagnetic force, though claimed subject matter is not limited to any particular actuators. Of course, details of compact imaging module 200 are merely examples, and claimed subject matter is not limited in this respect.

Figure 3:
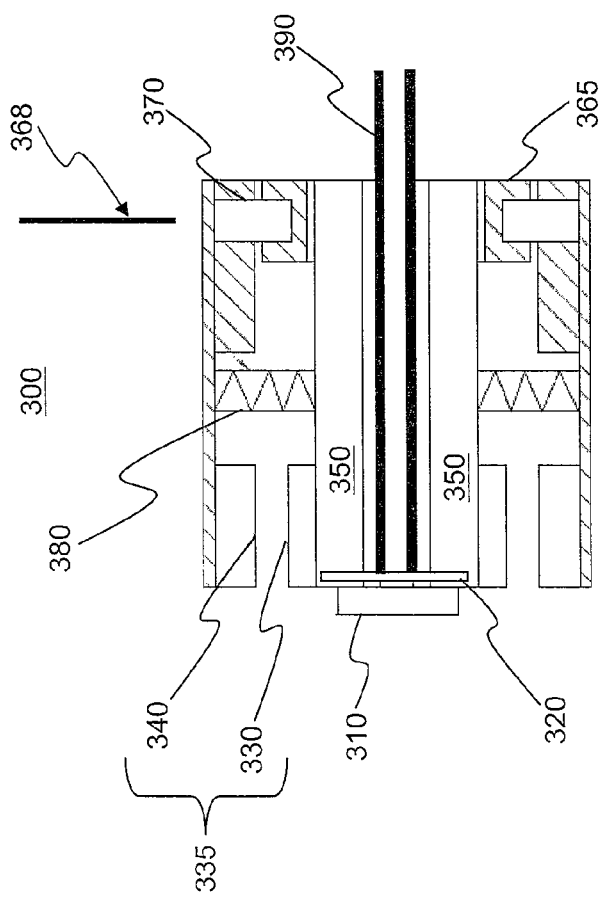
FIG. 3 is a cross-section view of an image sensor holder platform, according to an embodiment.

FIG. 3 is a cross-section view of an image sensor holder platform 300, according to an embodiment. Image sensor holder platform 300, which may be included in compact imaging module 200, for example, may be rotatable about a first orthogonal axis and a second orthogonal axis, as shown in FIG. 2. An image sensor 310 may be mounted on an end portion of an image sensor holder 350. In one particular implementation, image sensor 310 may be electrically connected and mounted to a printed circuit board (PCB) 320. One or more actuators 335 disposed adjacent to image sensor holder 350 may comprise a magnet 340 and a coil 330, though there need not be a one-to-one correspondence between magnets and coils. For example, two magnets may correspond to one coil, though claimed subject matter is not limited in this respect. Such actuators may impart a rotational motion on image sensor holder 350 in order to rotate image sensor 310. One such rotational motion may be enabled by a tilting table hinge 365 and a rotation shaft 370, which provide rotational freedom about an axis 368. Accordingly, a rotational position of image sensor holder 350 may be selected and/or adjusted by using such actuators. Here, rotational position may be described in terms of an angle of rotation about one or more axes such as axis 368, for example. Image sensor holder 350 may have an interior hollow region to provide a channel for electrical conductors 390 that connect to image sensor 310 via PCB 320, for example. In one implementation, electrical conductors 390 may pass through or near a rotating axis and/or pivot center, resulting in a relatively low amount of bending of the electrical conductors. Thus, dragging forces resulting from rotation of image sensor holder 350 may also be relatively low. One or more springs 380 may contact image sensor holder 350 and compress or stretch in response to rotational motion of the image sensor holder. Accordingly, springs 380 may counteract electromagnetic forces that actuators 335 impart on image sensor holder 350.

Figure 4:
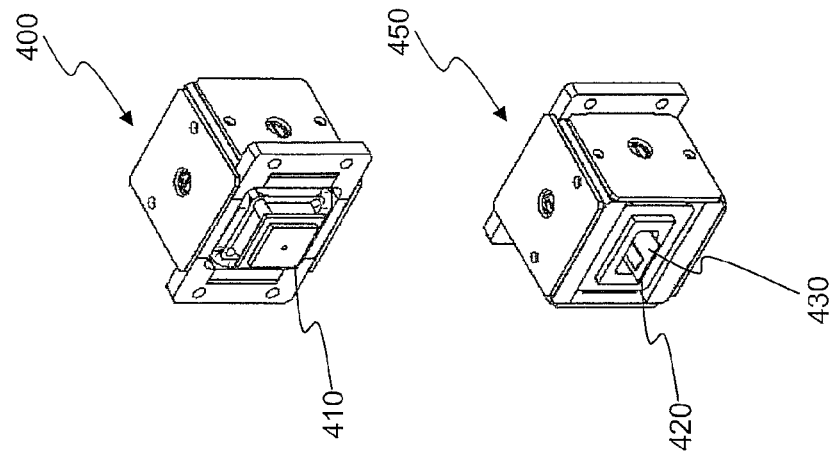
FIG. 4 includes perspective views of an image sensor holder platform, according to an embodiment.

FIG. 4 includes front and back perspective views of an image sensor holder platform, according to an embodiment. In perspective view 400, a sensor holder platform may comprise an image sensor 410 mounted to a front face of the image sensor holder platform. In perspective view 450, an image sensor holder platform may comprise a hollow region 420 to provide a channel for electrical conductors 430, which may exit the image sensor holder platform at a back face opposite to where image sensor 410 is located. Of course, such details of an image sensor holder platform are merely examples, and claimed subject matter is not limited in this respect.

Figure 5:
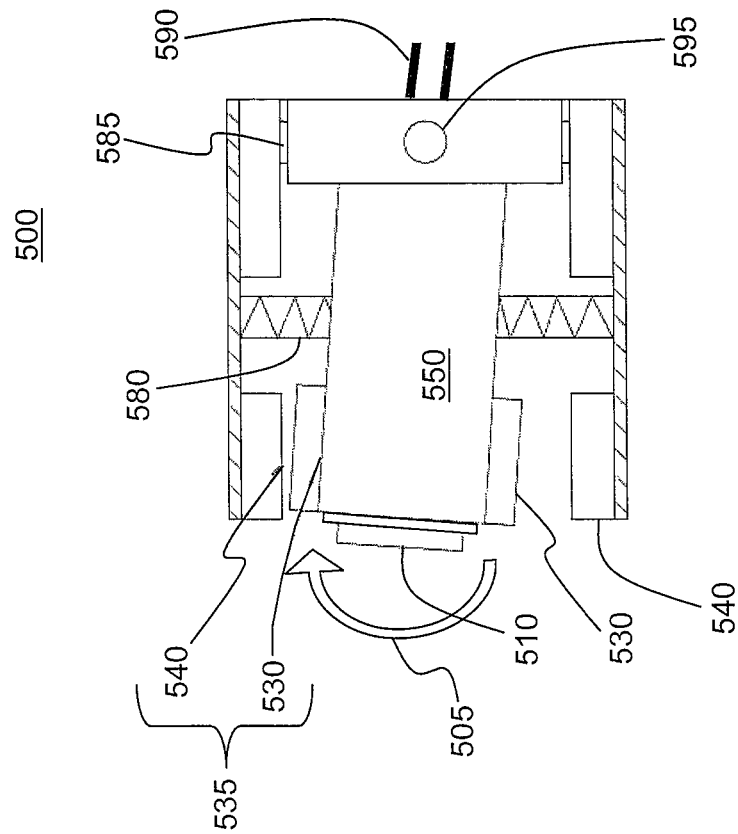

FIG. 5 is a side view of an image sensor holder platform 500, according to an embodiment. Image sensor holder platform 500, which may be included in a compact imaging module, for example, may be rotatable about a first orthogonal axis and a second orthogonal axis, as described above. An image sensor 510 may be mounted on an end region of an image sensor holder 550. One or more actuators 535 disposed adjacent to image sensor holder 550 may comprise a magnet 540 and a coil 530. Such actuators may impart rotational motion about various axes, as described below, on image sensor holder 550 in order to rotate image sensor 510. One such rotational motion about an axis defined by rotation shaft 595 is indicated in FIG. 5 by rotation arrow 505, for example. In a particular implementation, an additional rotational degree of freedom orthogonal to that represented by rotation arrow 505 may be facilitated by rotation about shaft 585.

As shown in FIG. 5, one or more actuators 535 may be activated if, for example, an electrical current travels through coil 530. Such a current may induce a magnetic field to produce an attractive and/or repulsive force with respect to magnet 540. Accordingly, image sensor holder 550 attached to coil 530 may move towards/away from magnet 540 to rotate image sensor holder 550 about an axis defined by rotation shaft 595. Meanwhile, a coil spring 580 may be attached to image sensor holder 550 to apply a restoring force to image sensor holder 550.

Figure 6:
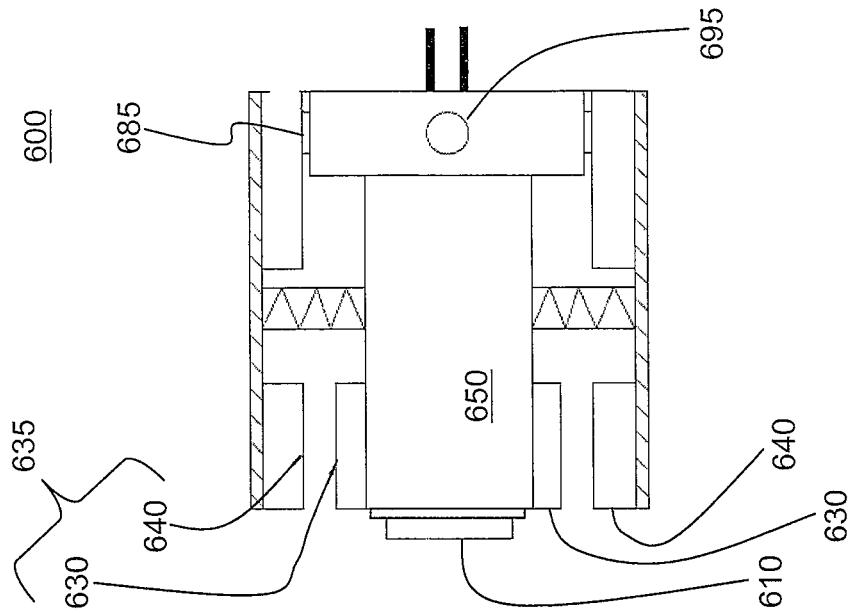

FIG. 6 is a side view of an image sensor holder platform 600, according to an embodiment. Image sensor holder platform 600 may be rotatable about a first orthogonal axis corresponding to rotation shaft 695 and a second orthogonal axis corresponding to rotation shaft 685, as described above. An image sensor 610 may be mounted on an end region of an image sensor holder 650. One or more actuators 635 disposed adjacent to image sensor holder 650 may comprise a magnet 640 and a coil 630. Such actuators may be non-activated if, for example, there is no electrical current travelling through coil 630. Lacking such a current, there may be no magnetic field to produce an attractive or repulsive force with respect to magnet 640. Accordingly, image sensor holder 650 connected to coil 630 may remain at a substantially neutral position relative to magnet 640. In one embodiment, actuators 635 may involve varying degrees of activation based, at least in part, on a varying magnitude of electrical current travelling in a coil 630. Such varying degrees of activation may provide varying degrees of rotation of image sensor 610. For example, a rotation angle of image sensor 610 may be based, at least in part, on a magnetic field. In another embodiment, different actuators may be activated to provide motion in the same or different degrees of freedom. Of course, such details of an image sensor holder platform are merely examples, and claimed subject matter is not so limited.

Figure 7:
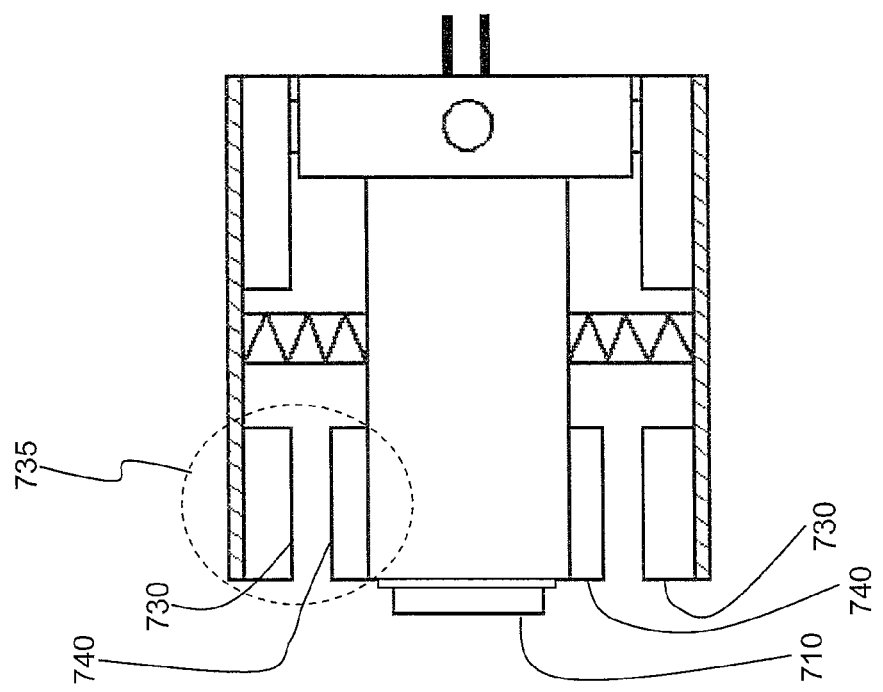

FIG. 7 is a side view of an image sensor holder platform 700, according to another embodiment. One or more actuators 735 may be selectively activated to rotate image sensor 710, as described above, for example. Such actuators may comprise a coil 730 and a magnet 740 mounted on an image sensor holder 750. Such a coil-magnet configuration may be opposite to previously-described embodiments, wherein a coil is mounted to an image sensor holder, not a magnet.

FIG. 8 is a side view of an image sensor holder platform 800, according to another embodiment. Image sensor holder platform 800, which may be included in a compact imaging module, for example, may be rotatable about a first orthogonal axis and a second orthogonal axis, as described above. An image sensor 810 may be mounted on an end region of an image sensor holder 850. One or more actuators 835 disposed adjacent to image sensor holder 850 may comprise a magnet 840 and a coil 830. In a particular implementation, coil 830 may include a hollow central region to contain at least a portion of magnet 840. As described above, such actuators may impart a rotational motion on image sensor holder 850 in order to rotate image sensor 810. Such rotational motion may be enabled by a rotation shaft 895. In a particular implementation, an additional rotational degree of freedom orthogonal to that associated with rotation shaft 895 may be facilitated by rotation shaft 885. Such actuators may be non-activated if, for example, there is no electrical current travelling through coil 830. In the absence of such a current, there may be no magnetic field to produce an attractive or repulsive force with respect to magnet 840. Accordingly, image sensor holder 850 connected to coil 830 may remain at a substantially neutral position relative to magnet 840. Image sensor holder platform 800 may also include a coil spring 880 to provide a restoring torque to rotational displacements of image sensor holder 850. Electrical connectors 890 may exit a hollow channel included in image sensor holder 850, as described above. Of course, such details of an image sensor holder platform are merely examples, and claimed subject matter is not so limited.

FIG. 9 is a side view of an image sensor holder platform 900, according to an embodiment. Image sensor holder platform 900 may be rotatable about a first orthogonal axis corresponding to rotation shaft 995 and a second orthogonal axis corresponding to rotation shaft 985, as described above. An image sensor 910 may be mounted on an end region of an image sensor holder 950. One or more actuators 935 disposed adjacent to image sensor holder 950 may comprise a magnet 940 and a coil 930. One or more actuators 935 may be activated if, for example, an electrical current travels through coil 930. Such a current may induce a magnetic field to produce an attractive and/or repulsive force with respect to magnet 940. Accordingly, image sensor holder 950 attached to magnet 940 may move into or out of coil 930 to rotate image sensor holder 950 about an axis defined by rotation shaft 995. Meanwhile, a coil spring 980 may be attached to image sensor holder 950 to apply a restoring torque to the image sensor holder. Image sensor holder platform 900 may also include a coil spring 980 to provide a restoring torque to rotational displacements of image sensor holder 950. Electrical connectors 990 may exit a hollow channel included in image sensor holder 950

In one embodiment, actuators 935 may involve varying degrees of activation based, at least in part, on a varying magnitude of electrical current travelling in a coil 930. Such varying degrees of activation may provide varying degrees of rotation of image sensor 910. For example, a rotation angle of image sensor 910 may be based, at least in part, on a magnetic field. In another embodiment, different actuators may be activated by the same or different degrees. Of course, such details of an image sensor holder platform are merely examples, and claimed subject matter is not so limited.

FIG. 10 is a side view of an image sensor holder platform 1000 including leaf springs 1080, according to an embodiment. An image sensor 1010 may be mounted onto an image sensor holder 1050, which may be rotated about one or two orthogonal axes in response to one or more actuators, as described in detail above. To counteract torques imparted by such actuators, one or more leaf springs 1080 may be arranged near an end region of image sensor holder 1050 to which image sensor 1010 may be mounted. Image sensor holder platform 1000 may include a frame 1020 to which one or more such leaf springs 1020 may be mounted. Other ends of such leaf springs may be connected to and/or contacting image sensor holder 1050. As in embodiments described above, image sensor holder 1050 may include an interior region 1070 to contain at least a portion of electrical connectors 1090 that lead to image sensor 1010, for example. Of course, such details of an image sensor holder platform are merely examples, and claimed subject matter is not so limited.

FIG. 11 is a side view of image sensor holder platform 1100 rotated in response to electromagnetic forces provided by one or more actuators, according to an embodiment. In particular, actuator 1135, which may comprise a magnet and coil, may produce an attractive electromagnetic force, while actuator 1145 produces a repulsive force. Such a combination of electromagnetic forces may provide a torque to rotate image sensor holder 1150 as shown in FIG. 11, for example. To counteract torques imparted by such actuators, one or more leaf springs 1180 may be arranged near an end region of image sensor holder 1150 to which image sensor 1110 may be mounted. Accordingly, in response to electromagnetic forces produced by actuators 1135 and 1145, leaf springs 1180 may bend and/or otherwise physically distort while absorbing energy to counteract such electromagnetic forces. Of course, such details of an image sensor holder platform are merely examples, and claimed subject matter is not so limited.

FIG. 12 is a side view of an image sensor holder platform 1200 including leaf springs 1280, according to an embodiment. An image sensor 1210 may be mounted onto an image sensor holder 1250, which may be rotated about one or two orthogonal axes in response to one or more actuators, as described in detail above. To counteract torques imparted by such actuators, one or more leaf springs 1280 may be arranged in a mid-region of image sensor holder 1250. Leaf springs 1280 may be mounted to a portion of image sensor holder platform 1200 and connected to and/or contacting image sensor holder 1250. In one particular implementation, leaf springs 1280 may be attached to a supporting structure 1260 of image sensor holder 1250. As in embodiments described above, image sensor holder 1250 may include an interior region, such as interior region 1070 shown in FIG. 10 for example, to contain at least a portion of electrical connectors 1290 that lead to image sensor 1210, for example.

FIG. 13 is a side view of image sensor holder platform 1300 rotated in response to electromagnetic forces provided by one or more actuators, according to an embodiment. To counteract torques imparted by such actuators, one or more leaf springs 1380 may be arranged near a mid region of image sensor holder 1350 to which image sensor 1310 may be mounted. Accordingly, in response to electromagnetic forces produced by such actuators, leaf springs 1380 may bend and/or otherwise physically distort while absorbing energy to counteract such electromagnetic forces.

Figure 14:
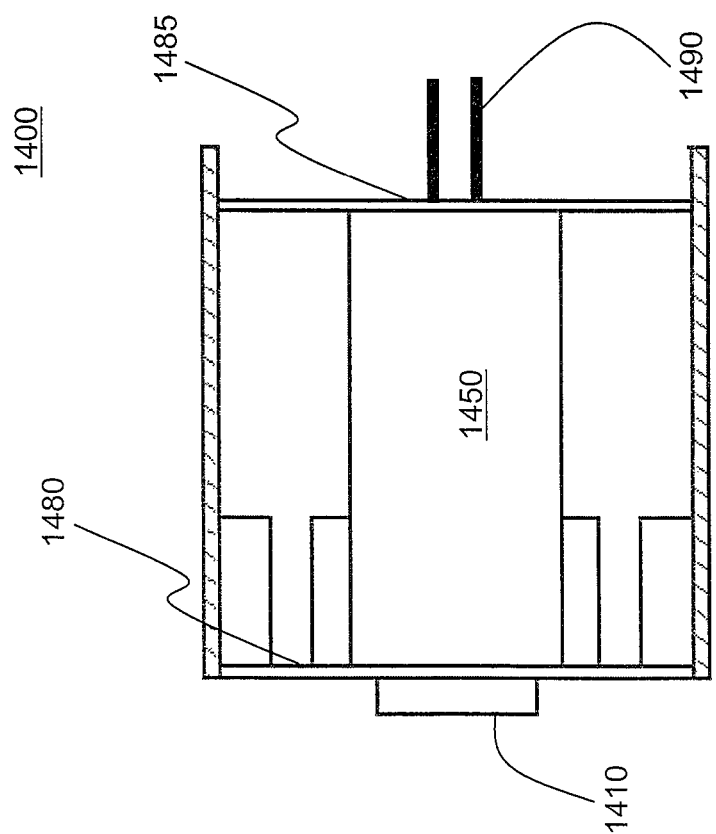

FIG. 14 is a side view of an image sensor holder platform 1400 including leaf springs, according to an embodiment. An image sensor 1410 may be mounted onto an image sensor holder 1450, which may be rotated about one or two orthogonal axes in response to one or more actuators, as described in detail above. In particular, leaf springs 1480 may be located at a front end of image sensor holder 1450 near mounted image sensor 1410, and leaf springs 1485 may be located at an opposite back end of an image sensor holder 1450. Such leaf springs may be used to counteract electromagnetic forces and/or torques imparted by actuators. Leaf springs 1480 and 1485 may be mounted to a portion of image sensor holder platform 1400 and connected to and/or contacting image sensor holder 1450. As in embodiments described above, image sensor holder 1450 may include an interior region, such as interior region 1070 shown in FIG. 10 for example, to contain at least a portion of electrical connectors 1490 that lead to image sensor 1410, for example. In a particular implementation, image sensor holder 1450 may be configured to rotate about a center point of rotation comprising a virtual pivoting center, as described above. For example, as one or more leaf springs 1480 and 1485 bend or compress, image sensor holder 1450 may rotate about a virtual pivot center defined by the leaf springs and/or particular motion of the leaf springs at a particular time. Thus, image sensor holder 1450 may rotate about a central portion of image sensor holder 1450, a corner portion of image sensor holder 1450, a region external to image sensor holder 1450, and so on. In other words, lack of a physical structure such as a shaft and/or pin may lead to a pivot center located at a variety of points, for example. Of course, such details of an image sensor holder platform are merely examples, and claimed subject matter is not so limited.

Figure 15:
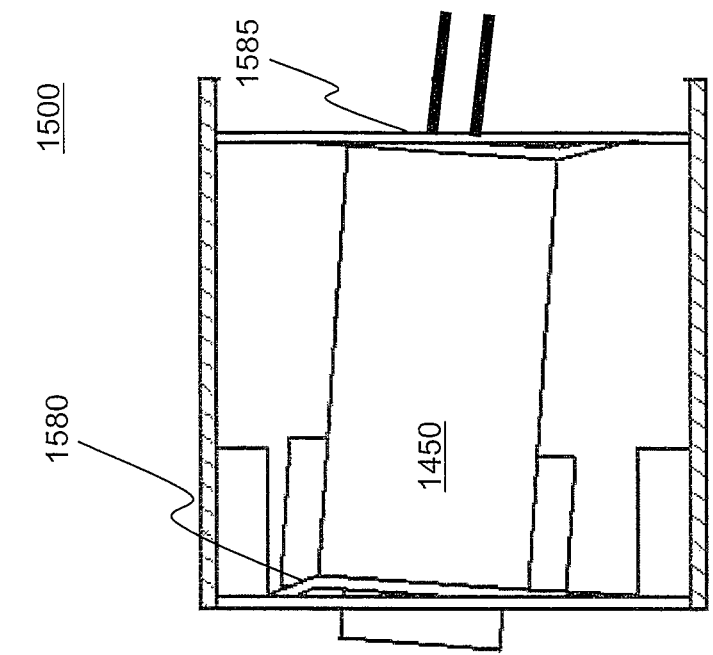

FIG. 15 is a side view of image sensor holder platform 1500 rotated in response to electromagnetic forces provided by one or more actuators, according to an embodiment. To counteract forces and/or torques imparted by such actuators, one or more leaf springs 1580 may be located at a front end of image sensor holder 1550 and leaf springs 1485 may be located at an opposite back end of an image sensor holder 1450, as for image sensor holder platform 1400 described above, for example. Accordingly, in response to electromagnetic forces produced by one or more actuators, leaf springs 1580 and 1585 may bend and/or otherwise physically distort while absorbing energy to counteract such electromagnetic forces and/or torques. Of course, such details of a compact imaging module are merely examples, and claimed subject matter is not so limited.

One skilled in the art will realize that a virtually unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   an image sensor;
   an image sensor holder to hold said image sensor, wherein said image sensor holder includes a plurality of external surfaces and a region to contain at least a portion of electrical conductors electrically connected to said image sensor, and one of the plurality of external surfaces comprises an end face on which the image sensor is mounted;
   an actuator to adjust a rotational position of said image sensor holder by rotating said image sensor holder around an axis defined by a rotation shaft and a tilting table hinge located at an end of said image sensor holder opposite the end face to which the image sensor is mounted, wherein the tilting table hinge and the rotation shaft define a pivot center located at an empty space of a hollow portion of the image sensor holder; and
   at least one spring contacting the image sensor holder to provide a compression/stretching force in response to rotational motion of the image sensor holder.

2. The apparatus of claim 1, wherein said at least one spring comprises coil springs disposed at a mid-portion of said image sensor holder.

3. The apparatus of claim 1, wherein said at least one spring comprises a leaf spring disposed at a mid-portion of said image sensor holder.

4. The apparatus of claim 1, wherein said at least one spring comprises a leaf spring disposed at a first end-portion of said image sensor holder.

5. The apparatus of claim 4, wherein said at least one spring further comprises an additional leaf spring disposed at a second end-portion of said image sensor holder.

6. The apparatus of claim 1, wherein said electrical conductors comprise a flexible printed circuit board (PCB).

7. The apparatus of claim 1, wherein, said actuator includes at least one magnet and at least one coil to produce an electromagnetic force.

8. The apparatus of claim 7, wherein said at least one magnet moves with said image sensor holder if said at least one coil is energized.

9. The apparatus of claim 7, wherein a distance between said image sensor holder and said at least one magnet is adjustable, at least in part, in response to said electromagnetic force.

10. The apparatus of claim 7, wherein a distance between said image sensor holder and said at least one coil is adjustable, at least in part, in response to said electromagnetic force.

11. The apparatus of claim 1, wherein said at least one coil moves with said image sensor holder if said at least one coil is energized.

12. The apparatus of claim 1, wherein said image sensor comprises a pixilated charge-coupled device (CCD) or a complementary metal-oxide-semiconductor (CMOS) device.

13. The apparatus of claim 1, further comprising one or more additional rotation shafts to provide rotational degrees of freedom about said at least one axis.

14. The apparatus of claim 13, wherein said one or more rotation shafts comprise two shafts that are substantially orthogonal to one another.

15. The apparatus of claim 1, wherein said axis comprises a virtual pivot point.

16. A method comprising:
    mounting an image sensor onto on end face of an image sensor holder that includes a region to contain at least a portion of electrical conductors electrically connected to said image sensor;
    placing at least a portion of said electrical conductors inside a hollow portion of said image sensor holder;
    positioning an actuator adjacent to said image sensor holder, said actuator to adjust a rotational position of said image sensor holder by rotating said image sensor holder around an axis defined by a rotation shaft and a tilting table hinge located at an end of said image sensor holder opposite the end face on which the image sensor is mounted, wherein the tilting table hinge and the rotation shaft define a pivot center located at an empty space of the hollow portion of the image sensor holder; and
    providing a compression/stretching force by at least one spring contacting the image sensor holder in response to rotational motion of the image sensor holder.

17. The method of claim 16, wherein said at least one spring comprises coil springs disposed at a mid-portion of said image sensor holder.

18. The method of claim 16, wherein said at least one spring comprises a leaf spring disposed at a mid-portion of said image sensor holder.

19. The method of claim 16, wherein said at least one spring comprises a leaf spring disposed at a first end-portion of said image sensor holder.

20. The method of claim 19, wherein said at least one spring further comprises an additional leaf spring disposed at a second end-portion of said image sensor holder.

21. The method of claim 16, wherein said electrical conductors comprise a flexible printed circuit board (PCB).

22. The method of claim 16, wherein, said actuator includes at least one magnet and at least one coil to produce an electromagnetic force.

23. The method of claim 22, wherein said at least one magnet moves with said image sensor holder if said at least one coil is energized.

24. The method of claim 22, wherein a distance between said image sensor holder and said at least one magnet is adjustable, at least in part, in response to said electromagnetic force.

25. The method of claim 22, wherein a distance between said image sensor holder and said at least one coil is adjustable, at least in part, in response to said electromagnetic force.

26. The method of claim 16, wherein said at least one coil moves with said image sensor holder if said at least one coil is energized.

27. The method of claim 16, wherein said image sensor comprises a pixilated charge-coupled device (CCD) or a complementary metal-oxide-semiconductor (CMOS) device.

28. The method of claim 16, wherein said actuator is further to adjust said rotational position about at least two axes which are substantially orthogonal to one another.

29. An apparatus comprising:
    an image sensor;
    an image sensor holder to hold said image sensor, wherein said image sensor holder includes a hollow portion to contain at least a portion of electrical conductors electrically connected to said image sensor, wherein the image sensor is mounted on an end face of the image sensor holder;
    one or more rotation shafts to provide rotational degrees of freedom about one or more axes that are substantially orthogonal to one another;
    an actuator to adjust a rotational position of said image sensor holder by rotating said image sensor holder around at least one of said axes defined by said one or more rotational shaft and a tilting table hinge located at an end of said image sensor holder opposite the end face on which the image sensor is mounted, wherein said actuator includes at least one magnet and at least one coil to produce an electromagnetic force, wherein the tilting table hinge and the rotation shaft define a pivot center located at an empty space of the hollow portion of the image sensor holder; and
    at least one spring contacting the image sensor holder to provide a compression/stretching force to counteract the electromagnetic force.

30. The apparatus of claim 29, wherein said at least one spring comprises coil springs disposed at a mid-portion of said image sensor holder.

31. The apparatus of claim 29, wherein said at least one spring comprises a leaf spring disposed at a mid-portion of said image sensor holder.

32. The apparatus of claim 29, wherein said at least one spring comprises a leaf spring disposed at a first end-portion of said image sensor holder.

33. The apparatus of claim 32, wherein said at least one spring further comprises an additional leaf spring disposed at a second end-portion of said image sensor holder.

34. The apparatus of claim 29, wherein said electrical conductors comprise a flexible printed circuit board (PCB).

* * * * *